US009759929B2

(12) United States Patent
Rinehart

(10) Patent No.: US 9,759,929 B2
(45) Date of Patent: Sep. 12, 2017

(54) MULTIPURPOSE EYEWEAR WITH ADJUSTABLE ARMS

(71) Applicant: Steven Larsen Rinehart, Fruit Heights, UT (US)

(72) Inventor: Steven Larsen Rinehart, Fruit Heights, UT (US)

(*) Notice: Subject to any disclaimer, the term of this patent is extended or adjusted under 35 U.S.C. 154(b) by 94 days.

(21) Appl. No.: 14/867,607

(22) Filed: Sep. 28, 2015

(65) Prior Publication Data

US 2017/0090212 A1   Mar. 30, 2017

(51) Int. Cl.
| | | |
|---|---|---|
| *G02C 5/22* | (2006.01) | |
| *G02C 5/20* | (2006.01) | |
| *G02C 11/08* | (2006.01) | |
| *G02C 5/14* | (2006.01) | |
| *G02C 5/02* | (2006.01) | |
| *G02C 1/08* | (2006.01) | |
| G02C 5/12 | (2006.01) | |
| G02C 3/00 | (2006.01) | |
| G02C 5/00 | (2006.01) | |
| G02C 5/18 | (2006.01) | |

(52) U.S. Cl.
CPC .............. *G02C 5/20* (2013.01); *G02C 1/08* (2013.01); *G02C 5/02* (2013.01); *G02C 5/143* (2013.01); *G02C 5/146* (2013.01); *G02C 11/08* (2013.01); G02C 3/006 (2013.01); G02C 5/006 (2013.01); G02C 5/12 (2013.01); G02C 5/18 (2013.01); G02C 2200/02 (2013.01); G02C 2200/08 (2013.01)

(58) Field of Classification Search
CPC .......... G02C 5/22; G02C 5/143; G02C 5/146; G02C 5/006; G02C 5/08

USPC ...... 351/63, 62, 118, 119, 153, 111; 16/228; 2/454

See application file for complete search history.

(56) References Cited

U.S. PATENT DOCUMENTS

| | | | | |
|---|---|---|---|---|
| 4,699,479 A | * | 10/1987 | Metcalfe | ................ G02C 5/146 |
| | | | | 16/228 |
| 5,638,145 A | | 6/1997 | Jannard | |
| D470,166 S | | 2/2003 | Yee | |
| 7,731,354 B1 | * | 6/2010 | Kwan | ...................... G02C 5/08 |
| | | | | 351/137 |
| 2014/0340628 A1 | * | 11/2014 | Huang | ................... G02C 5/006 |
| | | | | 351/63 |
| 2015/0042947 A1 | * | 2/2015 | Barnett | .................... G02C 5/20 |
| | | | | 351/63 |

* cited by examiner

*Primary Examiner* — Hung Dang
(74) *Attorney, Agent, or Firm* — Steven Rinehart

(57) ABSTRACT

A pair of glasses with multiple pivoting arms provides size adjustability to fit on different sized and dimensioned heads. The glasses enhance functionality, ergonomic comfort, tethering capacity, and aesthetics. A frame retains a pair of lenses. In some embodiments, the frame bifurcates to enable interchanging the lenses. A frame adjustment fastener may engage a recess in the frame to tighten and loosen the frame around the lenses. A pair of forward arms hingedly join the frame. A pair of rearward arms may hingedly join the forward arms. The forward and rearward arms pivot laterally and independently of each other. Hinge adjustment fasteners loosen and tighten the pivoting motion of the arms in some embodiments. Stress cavities absorb pressure applied by the hinge adjustment fasteners. Vents at the forward arms disrupt air flow behind the frame to minimize moisture accumulation at the lenses.

25 Claims, 15 Drawing Sheets

MULTIPURPOSE EYEWEAR WITH ADJUSTABLE ARMS

FIELD OF THE INVENTION

This invention relates to eyewear, and more particularly relates to multipurpose eyewear having a plurality of arms that pivot laterally to enable size adjustment of the eyewear.

BACKGROUND

Description of the Related Art

Generally, eyewear, comprising glasses and sunglasses, comprises frames that securely retain lenses in front of the eyes. The lenses are usually used for vision correction or for reducing glare, transmission of sunlight, or brightness to a wearer. Sunglasses are used to reduce transmission of sunlight, so as to minimize glare from the sun and protect from harmful ultraviolet rays. Some sunglasses are ornamental, or decorative in appearance, with multicolored or darker tinting to lenses it comprises. Sunglasses are also more durable since they are used in outdoor events, such as going to the beach, hiking, or donned while participating in sporting events.

Sunglasses are being worn by ever increasing numbers of people, who have been made aware of the damages of prolonged exposure of the eyes to ultraviolet rays emanating from the sun, or who simply prefer ornamental protection. To some wearers, sunglasses have become an extension of their face, appearance and identity, driving highly priced, highly ornamental sunglasses, into larger and larger portions of the market. The increasing demand for sunglasses specifically and eyewear generally has resulted in a proliferation of designs for sunglasses. Thus some sunglasses are designed primarily to meet functional objectives, while others are more stylish.

Sunglasses typically come in a one size fits all configuration, whereby such glasses can be a misfit, either too small or too large for the various head sizes and dimensions, including those of soldiers, athletes, drivers, and professionals. Ideally, sunglasses should fit snugly in order to prevent the sun's rays from getting to the eyes through the sides, top or around the frame. This is made difficult by the fact that the glasses in the art have one hinge between the arms and the frame(s).

Different shades of tint for the lenses are available. Each shade provides a different intensity of protection from the sunlight. The lenses are sometimes permanently sealed inside the frames. Additionally, heat and sweat behind the lenses can lead to moisture accumulation, i.e., fogging of the lenses. This can reduce visibility and cause the sunglasses to slip off the head.

There exists a need in the art for a pair of sunglasses that are inexpensive to manufacture, size adjustable, receptive to quick interchanging of lenses, and inhibitive of moisture buildup at the lenses. Current sunglasses are not effective.

SUMMARY

From the foregoing discussion, it should be apparent that a need exists for eyewear that is adjustable to fit different head sizes and dimensions, and also for glasses having multiple features that enhance ergonomic comfort, functionality, and aesthetics. Beneficially, such a pair of glasses would have size adjustable arms that rest on the ears and pivot laterally about hinges to conform to different head sizes. The glasses would also include: stress reducing components such as cantilevers at the forward arms, and a stress cavity at the hinges for reducing stress on the forward and rear arms; bifurcating frame that separates to enable interchanging lenses; vents in the forward arms that disrupt air flow behind the frame to minimize moisture accumulation at the lenses; padding at the nose and the arms to enhance comfort while donning the glasses; and apertures at the distal end of the rearward arms that receive cables for tethering the glasses. The frame, the forward arms, and the rearward arms are dynamic, such that size adjustment and adaptation with other components to provide comfort, functionality, and aesthetics are possible.

The present invention has been developed in response to the present state of the art, and in particular, in response to the problems and needs in the art that have not yet been fully solved by currently available glasses. Accordingly, the present invention has been developed to provide a size adjustable, multipurpose pair of glasses that overcome many or all of the above-discussed shortcomings in the art.

In some embodiments, the pair of glasses having multiple novel features for facilitated size adjustment, stress reduction on the arms and frame, and comfortable, secure donning of the glasses. The glasses include a frame that receives a pair of lenses. The frame is defined by a pair of lateral ends, a brow bar, a nose bridge, a padded nose rest, and a recess. The lateral ends hingedly join with a pair of forward arms. The nose bridge is configured to rest on the nose for support of the glasses. The nose bridge includes a padded nose rest that provides comfort to the nose and temple while donning the glasses.

Furthermore, the frame is configured to bifurcate into two hemispheres for facilitated interchangeability of the lenses. A frame adjustment fastener tightens the frame around the lenses. The frame adjustment fastener fits into the recess of the frame to tighten and loosen the frames at the recess. In one embodiment, the frame adjustment fastener is removed from the recess, causing the frame to bifurcate into hemispheres, such that the lenses can be removed for interchanging, cleaning, and repair. The recess is configured to reduce stress that is generated by the pressure and strain applied by the frame adjustment fastener. The recess also absorbs stress, strains, and pressure that arise from manipulation and donning of the glasses.

The glasses further include a pair of forward arms defined by a forward first end and a forward second end. The forward first end of the pair of forward arms hingedly join the pair of lateral ends of the frame at a forward hinge. The forward hinge forms an axis on which the forward arms pivot. The forward hinge may be adjusted to increase the torque at the forward hinge for tightening the pivoting motion of the forward arms, or reducing torque for loosening the pivoting action by the forward arms.

A forward hinge fastener is configured to rotatably engage a forward adjustment bore positioned proximal to the forward hinge for adjusting the tightness of the pivoting motion at the forward hinge. A forward stress cavity at the forward hinge absorbs stress on the forward arms when the forward hinge fastener applies pressure on the forward adjustment bore, or when the forward arms are pivoted, twisted, and manipulated in general.

In some embodiments, the forward first end forms a cantilever when the forward arm pivots in an inner direction about the frame. The cantilever is configured to carry stress along the length of the forward arm. The cantilever is disposed flush against the frame when the forward arms are extended.

In some embodiments, a pair of double prongs add additional stability to the forward hinge. The double prongs are disposed at the forward first end of the forward arms, pivotally moving in conjunction with the forward arm. The double prongs may pivotally project in a rearward direction from the frame, or project in a forward direction from the forward arm when the forward arm is pivoted. When the forward arm is extended, the double prongs are configured to clamp over the forward stress cavity.

In some embodiments, a vent forms in each forward arm. The vent is configured to receive airflow that funnels behind the frame. The vent disrupts the air flow, especially behind the lenses. This disturbance of air flow may generate an Eddie current that minimizes moisture accumulation at the lenses.

The glasses further include a pair of rearward arms defined by a rearward first end and a rearward second end. The rearward first end of the pair of rearward arms hingedly join the forward second end of the forward arms at a rearward hinge. The rearward hinge forms an axis on which the rearward arms pivot laterally. The rearward hinge may be adjusted to increase torque for tightening the pivoting motion of the rearward arms, or reducing torque for loosening the pivoting action by the rearward arms.

A rearward hinge fastener is configured to rotatably engage a rearward adjustment bore at the rearward hinge for adjusting the pivoting motion of the rearward hinge. A rearward stress cavity at the rearward hinge absorbs stress on the rearward arms when the rearward hinge fastener applies pressure on the rearward adjustment bore.

The rearward second ends of the rearward arms are tapered. This tapered shape is configured to facilitate reception of a pair of padded sleeves. The padded sleeves provide comfort to the ears and temple when donning the glasses. The rearward second end may also include at least one aperture that is configured to receive a cable. The cable is configured to hang around the neck or other object for tethering the glasses.

Both the forward and rearward arms pivot laterally in an inward and outward direction about their respective hinges resulting in increased width between oppositely disposed arms. This lateral pivoting movement facilitates adjustability of the glasses on the head. Further, the forward and rearward arms pivot independently of each other so as to provide greater flexibility for sizing and aesthetic disposition of the glasses.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
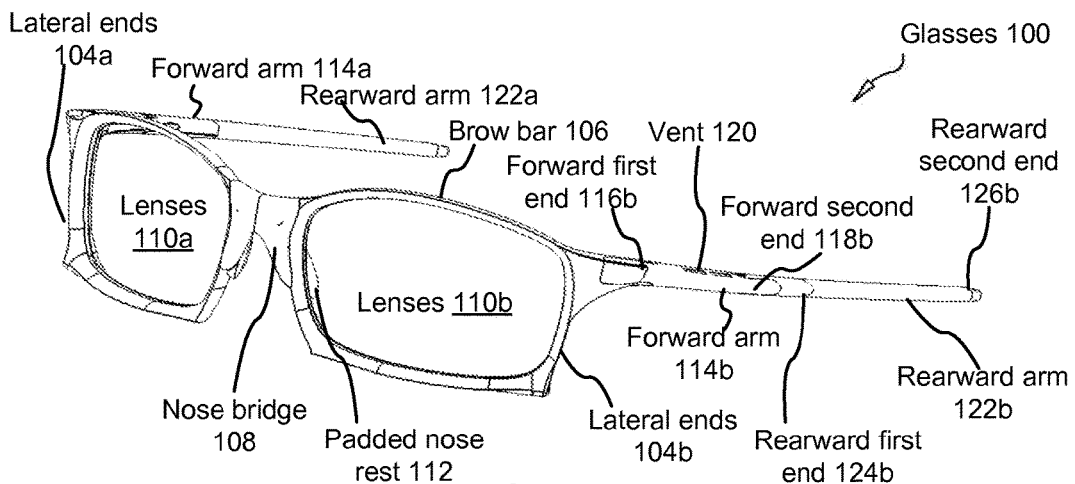
FIG. 1A is a front perspective view of multipurpose eyewear with adjustable arms in accordance with the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

One object of the present invention is to provide eyewear comprising, in some embodiments, a pair of sunglasses having multiple novel features for size adjustment and comfortable donning, including: a forward arm and a rearward arm that pivot laterally in an inward and outward direction about adjustable hinges for size adjustability of the sunglasses; a cantilever pivotally formed by the forward arm for carrying stress along the length of the forward arm; a hinge fastener for adjusting the torque of the hinge when pivoting, a stress cavity at the hinges for absorbing stress from the forward and rearward arms when the hinge fastener applies pressure on the hinges; vents at the forward arm that disrupt air flow behind the lenses to minimize moisture accumulation at the lenses; tapered rearward arms configured to receive a padded sleeve for enhancing comfort while donning the sunglasses; a frame adjustment fastener that loosens and tightens the frames at a recess for disassembling the frames and interchanging lenses; a nose bridge having a padded nose rest for enhanced comfort while donning the sunglasses; and apertures at the distal end of the rearward arms for receiving a cable that hangs around the head.

FIG. 1A-3B depict multipurpose eyewear comprising a pair of forward arms 114a-b and a pair of rearward arms 122a-b that pivot laterally, in an inner and outer direction, to increase the width of the glasses 100. The glasses 100 are configured to provide size adjustability, so as to fit on different heads, and also to provide aesthetic appearances while being donned. The glasses 100 also provide multiple components that enhance functionality, comfort, tethering capacity, and aesthetics. The glasses 100 may comprise of a frame 102, a pair of lenses 110a-b, a pair of forward arms 114a-b, and a pair of rearward arms 122a-b. These components join together to form a dynamic pair of glasses 100 that integrates various components and configurations to provide advantages over the prior art.

As shown in FIG. 1A, the frame 102 is configured to rest on the nose for supporting the glasses 100. The frame 102 detachably retains a pair of lenses 110a-b. The frame 102 is adjustable to bifurcate (or divide) near the forward hinges 130 for releasing the lenses. The frame 102 can also tighten around the lenses 110a-b using means known to those of skill in the art, including threaded screws. This enables the lenses 110a-b to be interchanged and securely retained with minimal stress on the frame 102. A pair of forward arms 114a-b hingedly join the frame 102.

The frame 102 may be fabricated from titanium, aluminum, steel, brass, gold, gold plating, carbon fiber, metal alloys, nylon, elastomeric or polymeric materials, or organic materials such as wood, or other materials known to those of skill in the art, using means known to those of skill in the art, including mold injection, 3D printing, or digital metal laser sintering (DMLS).

Looking now at FIGS. 1B, 1C, 1D, and 1E, a pair of rearward arms 122a-b hingedly join the forward arms 114a-b. The forward and rearward arms 114a-b, 122a-b rest on the ears for supporting the glasses 100. The forward and rearward arms 114a-b, 122a-b pivot laterally and independently of each other. The frame 102, the forward arms 114a-b, and the rearward arms 122a-b are dynamic and multi-jointed, such that size adjustment of the glasses 100 and adaptation with other components is possible.

The pair of glasses 100 may include, without limitation, sunglasses, prescription glasses, wraparound sunglasses, safety glasses, bifocals, welding glasses, goggles, and visors. Suitable materials for the glasses 100 and lenses may include, without limitation, titanium, metal alloy, aluminum, polymeric materials, cellulose acetate, organic materials like wood and ivory, and any combination of materials. The lenses 110a-b may be glass or plastic.

Figure 2A:
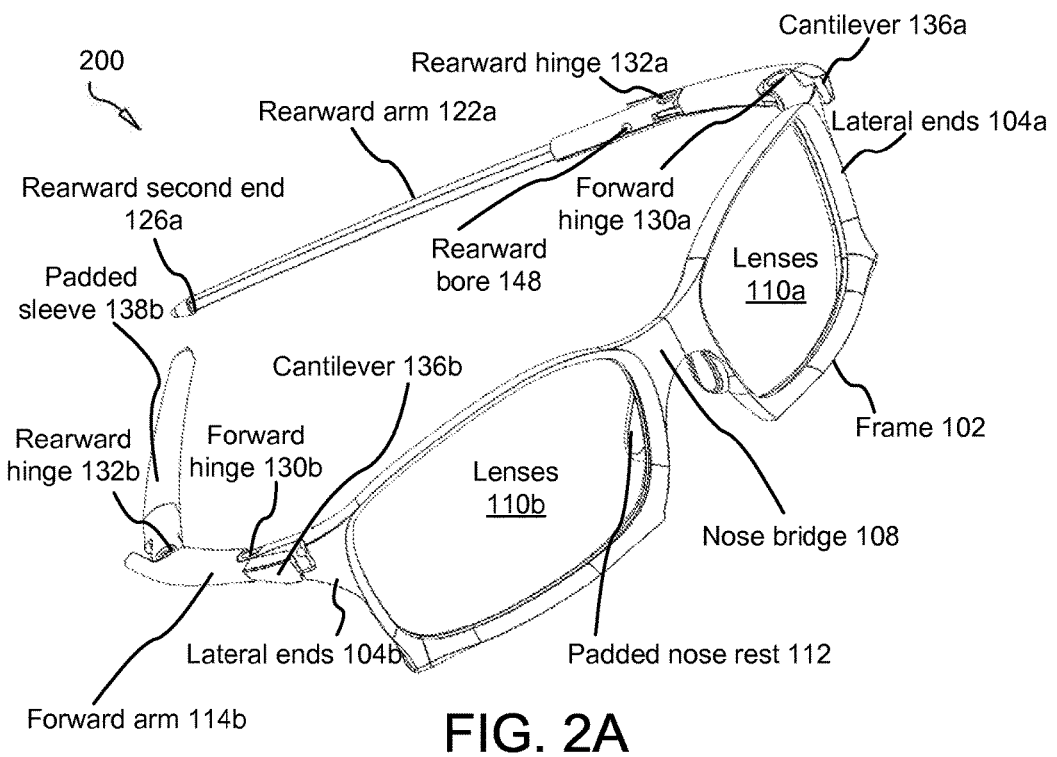
FIG. 2A is a front elevational perspective view of a hinged portion of multipurpose eyewear with adjustable arms in accordance with the present invention.
Figure 2B:
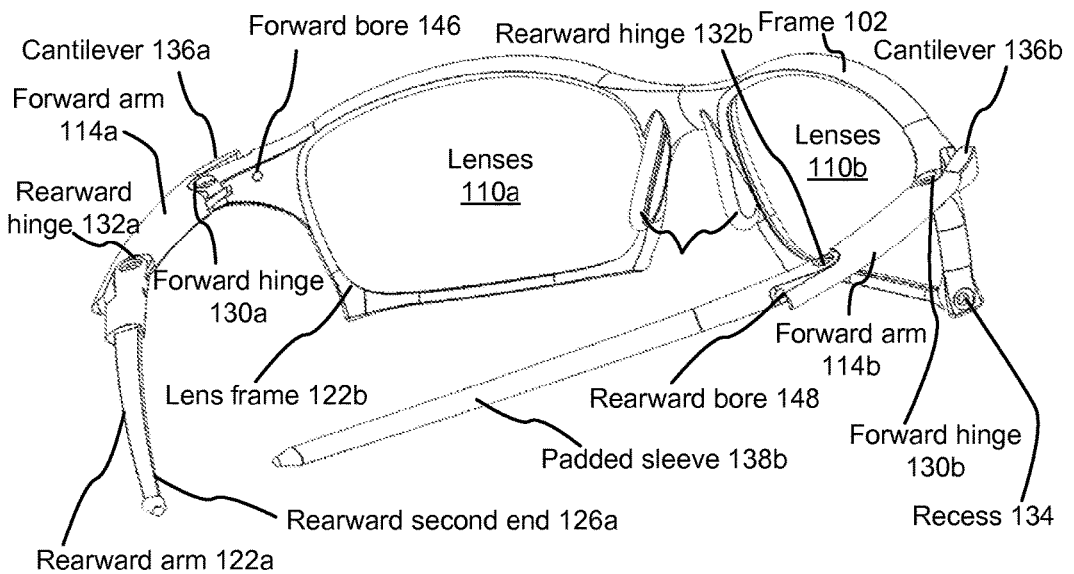
FIG. 2B is a rear elevational perspective view of a hinged portion of multipurpose eyewear with adjustable arms in accordance with the present invention.
Figure 2C:
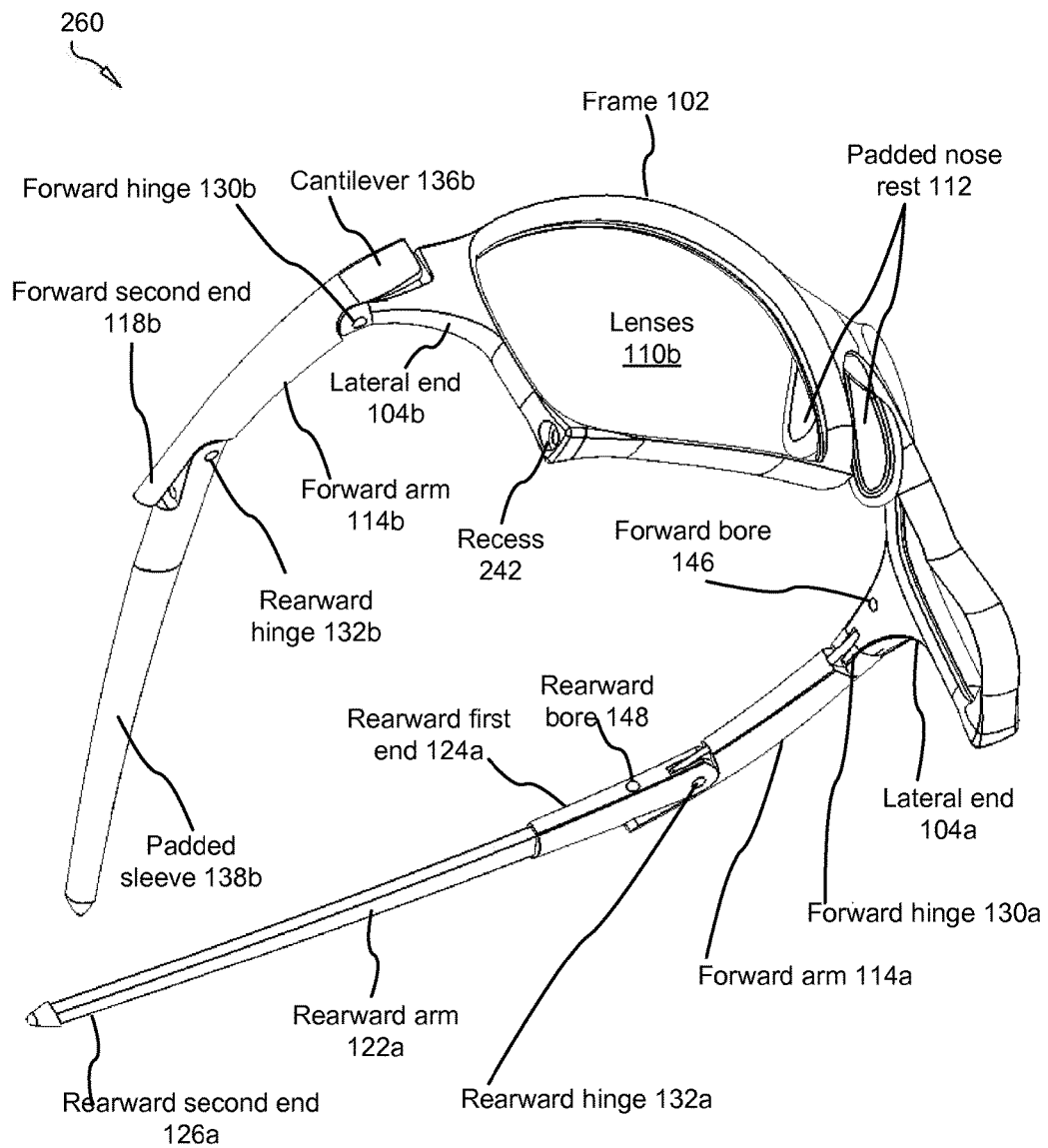
FIG. 2C is a lower side perspective view of a hinged portion of multipurpose eyewear with adjustable arms in accordance with the present invention.

As referenced in FIGS. 2A and 2B, the pair of glasses 100 include a frame 102 that receives a pair of lenses 110a-b. The frame 102 is defined by a pair of lateral ends 104a-b, a brow bar 106, a nose bridge 108, a padded nose rest 112, and a recess 134. The pair of lateral ends 104a-b, the brow bar 106, and the nose bridge 108 may form a generally annular shape that is configured to receive similarly shaped and dimensioned lenses 110a-b. Though, in other embodiments, other shapes are possible. The lenses 110a-b may be tinted for restricting the passage of light, or the lenses 110a-b may have contrasting thicknesses for enhancing vision of a wearer.

Figure 3A:
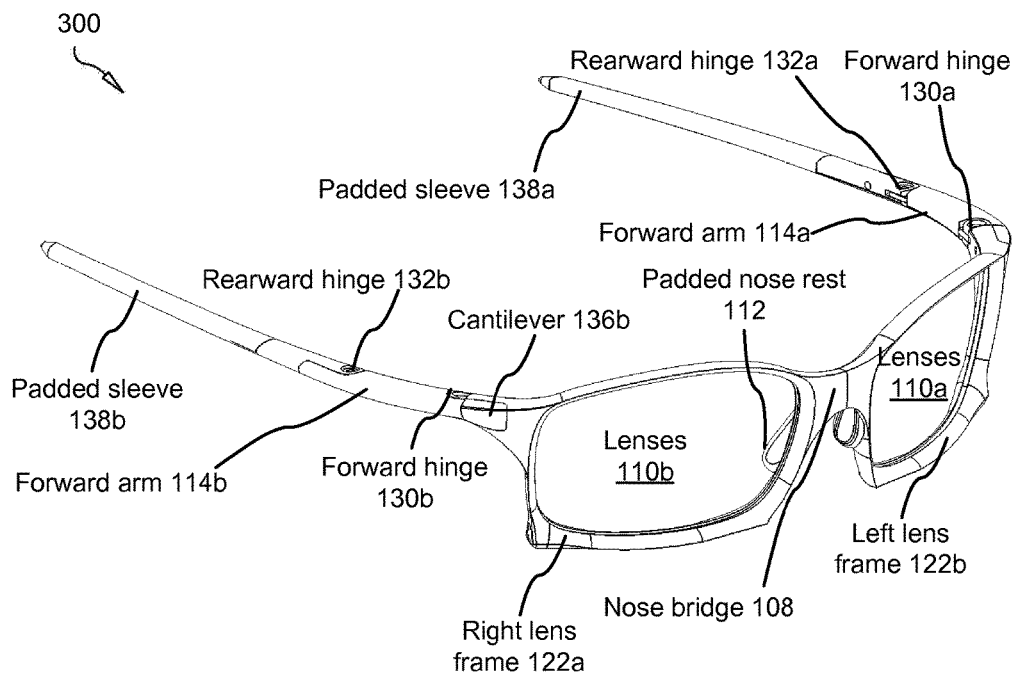
FIG. 3A is a front side elevational perspective view of a hinged portion of multipurpose eyewear with adjustable arms in accordance with the present invention.
Figure 3B:
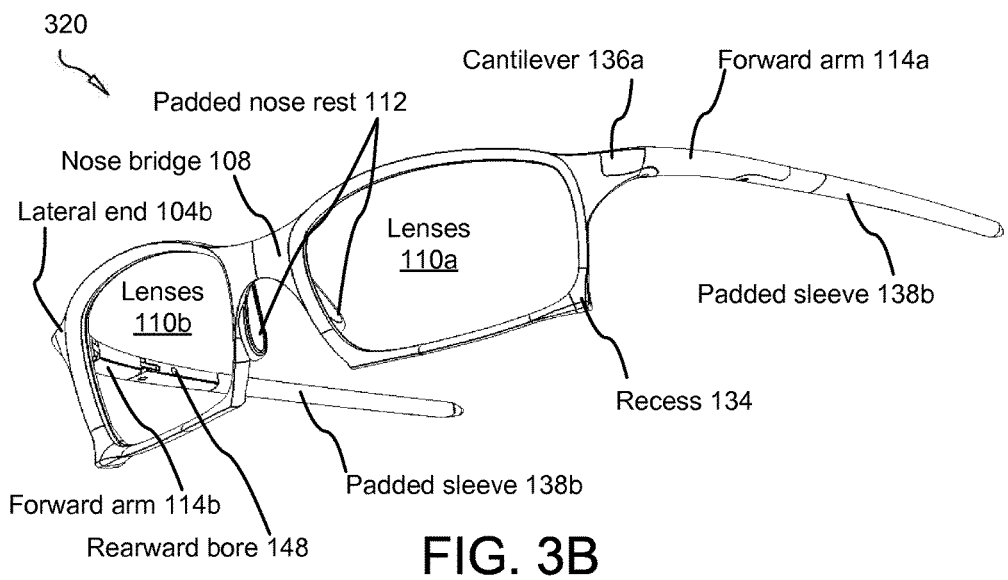
FIG. 3B is a rear lower perspective view of a hinged portion of multipurpose eyewear with adjustable arms in accordance with the present invention.

Turning now to FIGS. 3A and 3B, the nose bridge 108 of the frame 102 is configured to rest on the nose for support of the glasses 100. In some embodiments, the nose bridge 108 may include a padded nose rest 112. The padded nose rest 112 is configured to rest on the nose when donning the glasses 100 to enhance comfort of the nose and temple.

Figure 4:
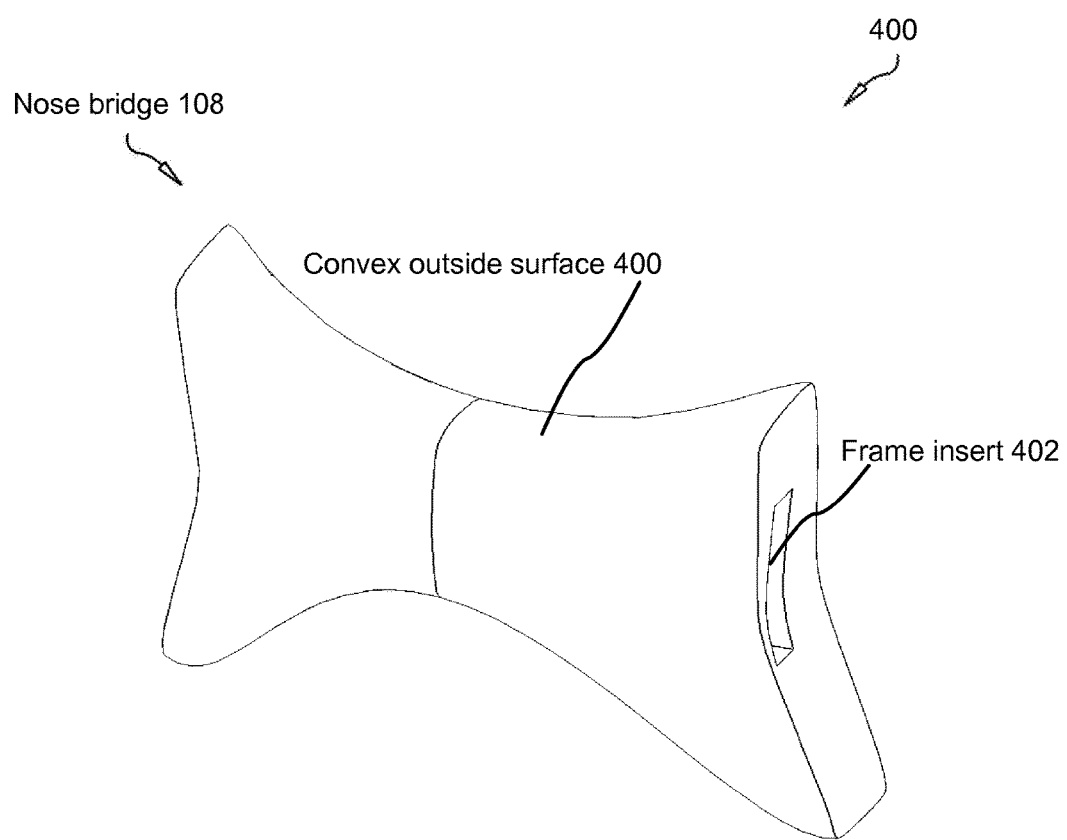
FIG. 4 is a front elevational perspective view of a nose guard in accordance with the present invention.

FIG. 4 illustrates the nose bridge 108 having a convex outside surface 400 that conforms to the shape of the nose for additional comfort. The nose bridge 108 also includes oppositely disposed frame 102 inserts for coupling to the frame 102. Those skilled in the art will recognize that the padding in the padded nose rest 112 and the uniquely shaped convex outside surface 400 of the nose bridge 108 enhance comfort and restrict slippage while donning the glasses 100.

Furthermore, the frame 102 is configured to bifurcate into two hemispheres for facilitated interchangeability of the lenses 110a-b. A frame adjustment fastener fits into a recess 134 in the frame 102 to tighten and loosen the frame 102 around the lenses 110a-b. The recess 134 is configured to reduce stress that is generated by the pressure and strain applied by the frame adjustment fastener. The recess 134 also absorbs stress, strains, and pressure that arise from manipulation and donning of the glasses.

In one embodiment, the frame adjustment fastener is rotated in a first direction to retract from the recess 134, causing the frame 102 to bifurcate into hemispheres, such that the lenses 110a-b can be removed for interchanging, cleaning, and repair. In another embodiment, the frame adjustment fastener rotates in a second direction to tighten the frame 102 around the lenses 110a-b. The frame adjustment fastener may include, without limitation, a screw, a bolt, a pin, a magnet, and an adhesive. In one alternative embodiment, the frame 102 bifurcates into two hemispheres through a snap-lock mechanism, whereby the frame adjustment fastener and the recess 134 are not utilized.

Looking back at FIG. 3B, the recess 134 is positioned on the frame 102, so as to reduce stress that is generated by the force of the frame adjustment fastener tightening and loosening the frame 102 around the lenses 110a-b. The recess 134 is especially effective when the frame adjustment fastener applies a strong pressure to securely retain the lenses 110a-b in the frame 102. In one embodiment, the recess 134 is disposed at a corner junction between the nose bridge 108 and the lateral ends 104a-b of the frame 102.

Figure 5A:
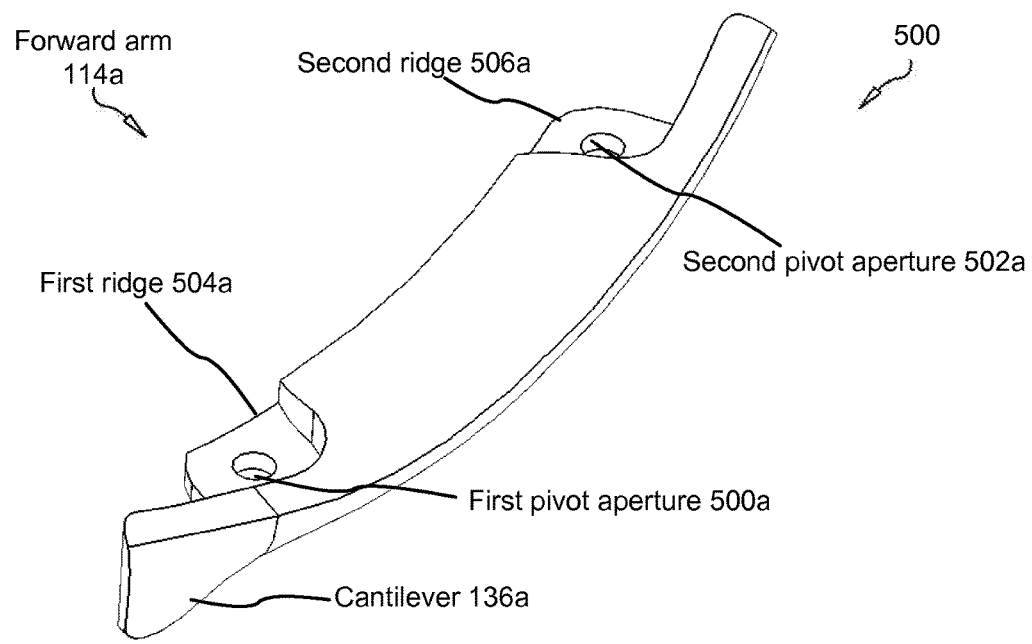
FIG. 5A is a front elevational perspective view of a forward arm in accordance with the present invention.

Turning now to FIG. 5A, the glasses 100 further include a pair of forward arms 114a-b defined by a forward first end 116a-b and a forward second end 118a-b. The forward arms 114a-b are elongated and flat, so as to comfortable rest behind the ears. The lateral ends 104a-b of the frame 102 hingedly join with the forward arms 114a-b about a forward hinge 130a-b.

Specifically, the forward first end 116a-b of the pair of forward arms 114a-b hingedly join the pair of lateral ends 104a-b of the frame 102 at the forward hinge 130a-b. The forward hinge 130a-b forms an axis on which the forward arms 114a-b may pivot laterally in both an inner and outer direction. The forward hinge 130a-b may be adjusted to increase torque for tightening the pivoting motion, or reduce torque for loosening the pivoting action by the forward arms 114a-b.

Figure 5B:
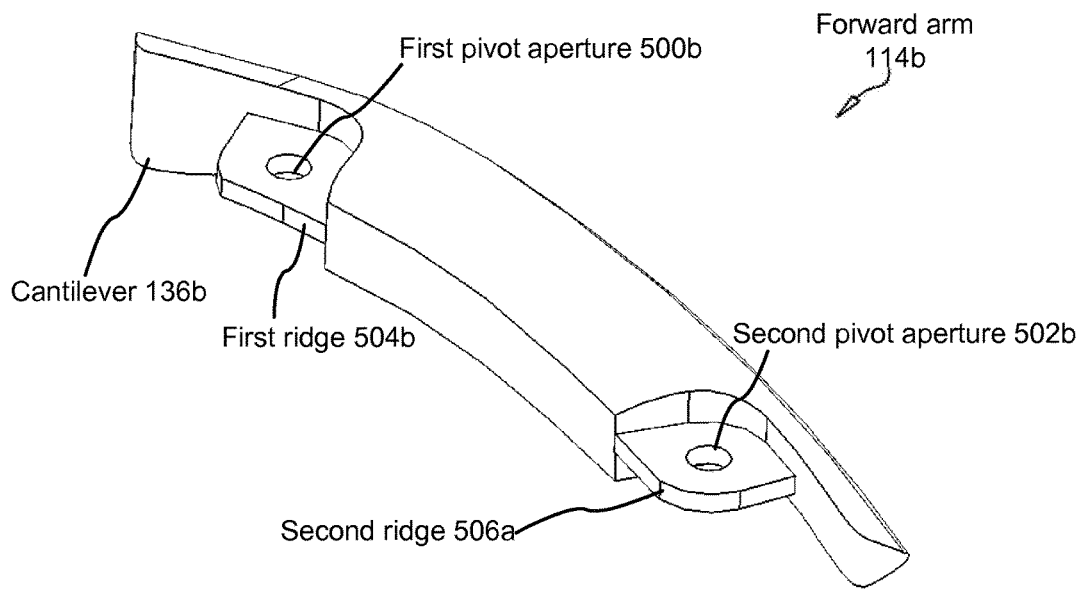
FIG. 5B is a rear elevational perspective view of a forward arm in accordance with the present invention.
Figure 6:
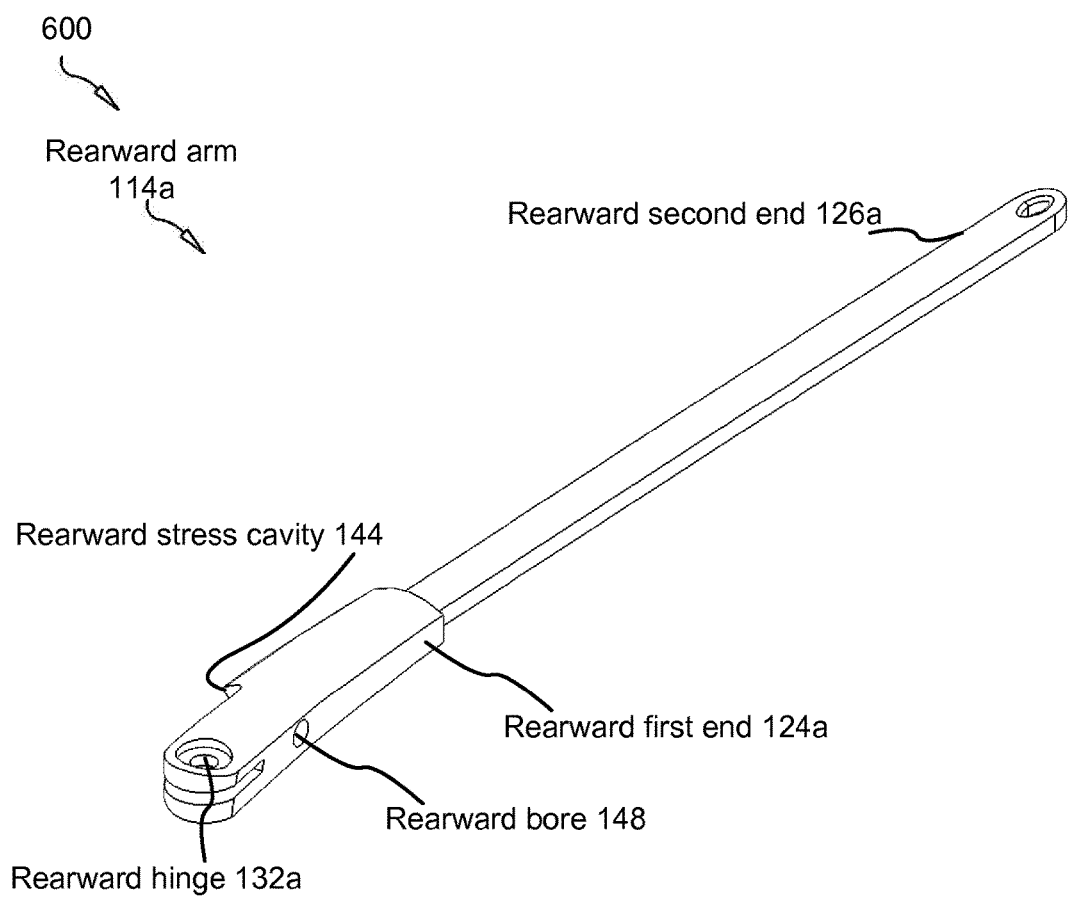
FIG. 6 is a front elevational perspective view of one embodiment of a rearward arm in accordance with the present invention.

As illustrated in FIGS. 5A and 5B, the forward arms 114a-b may include a pair of first pivot apertures 500a-b that are sized and dimensioned to receive the forward hinge 130a-b. This rotatable coupling enables a smooth pivoting motion that enables the forward arm to pivot laterally. Similarly, a pair of second pivot apertures 502a-b are disposed oppositely from the first pivot apertures 500a-b. The second pivot apertures 502a-b are configured to receive the rearward hinges 132a-b. This rotatable coupling between the first pivot apertures 500a-b and the rearward hinges 132a-b enables pivoting by the rearward arms 122a-b, shown in FIG. 6.

In some embodiments, the forward arms 114a-b may further include a pair of first ridges 504a-b that extend perpendicularly from the forward first end 116a-b of the forward arms 114a-b. The first ridges 504a-b support the lateral ends 104a-b of the frame 102. The forward arms 114a-b further include a pair of second ridges 506a-b that extend perpendicularly from the forward second end 118a-b of the forward arms 114a-b. The second ridges 506a-b support the pair of rearward arms 12a-b while in the fully extended position.

Figure 7A:
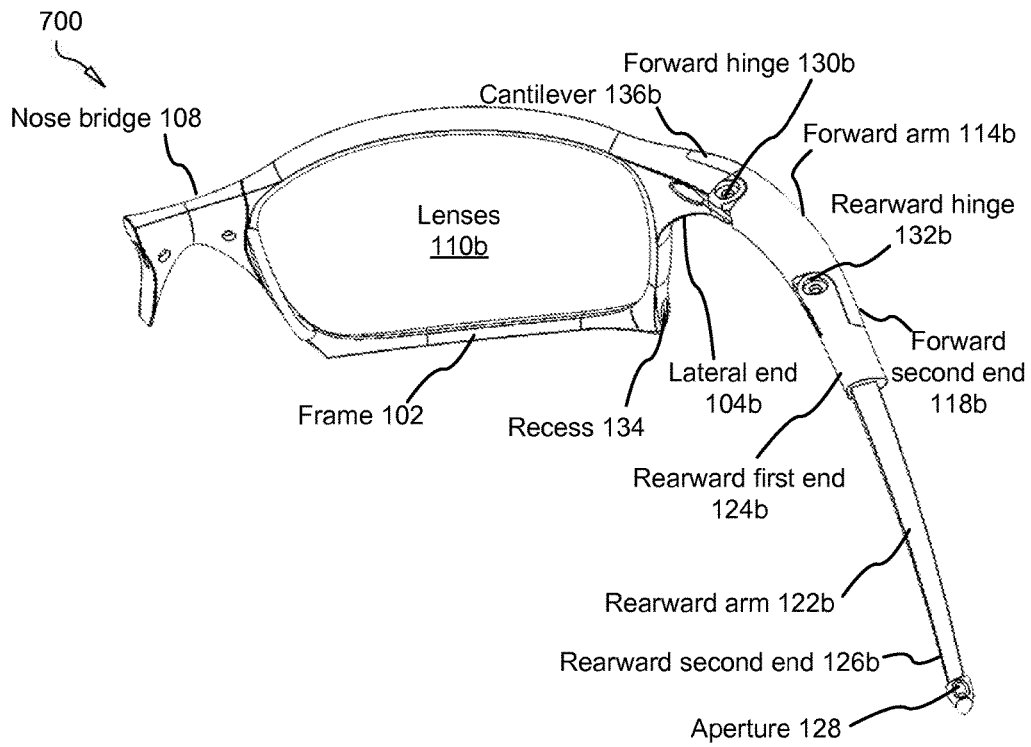
FIG. 7A is a rear elevational perspective view of one embodiment of multipurpose eyewear in accordance with the present invention.

As referenced in FIG. 7A, a forward hinge fastener (not shown) is configured to rotatably engage a forward adjustment bore 146 at the forward hinge 130a-b for adjusting the pivoting motion of the forward hinge 130a-b. In one possible embodiment, rotating the forward hinge fastener in a first direction creates torque on the forward hinge 130a-b, such that the forward arms 114a-b do not pivot freely, and eventually are restricted from pivoting. Conversely, rotating the forward hinge fastener in a second direction enables the forward arms 114a-b to pivot freely. The forward hinge fastener may include, without limitation, a screw, a bolt, a pin, a magnet, and an adhesive.

Figure 7B:
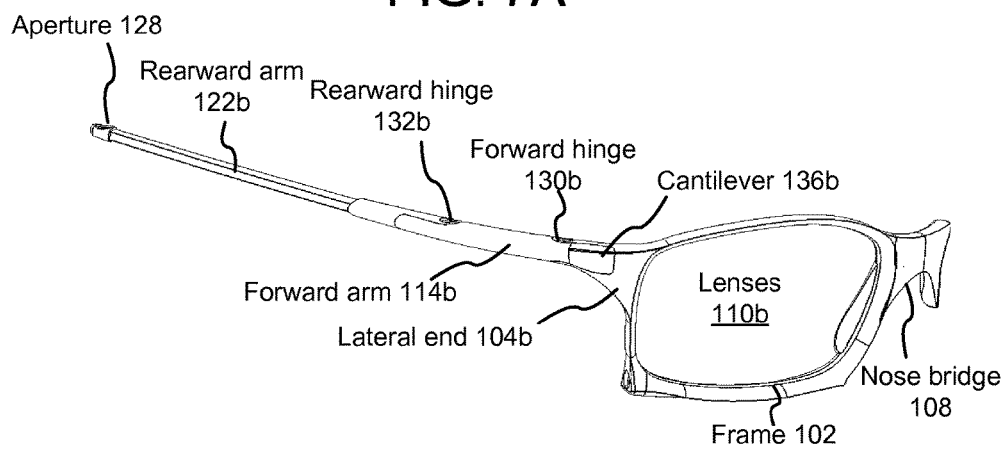
FIG. 7B is a side perspective view of one embodiment of multipurpose eyewear in accordance with the present invention.

Turning now to FIG. 7B, a forward stress cavity 142 forms proximally to the forward hinge 130a-b. The forward stress cavity 142 is configured to absorb stress, strain, and pressure that is generated directly on the forward arms 114a-b when the forward hinge fastener applies pressure on the forward adjustment bore 146. The forward stress cavity 142 is also efficacious for absorbing stress from manipulating the forward and rearward arms 114-ab, 122a-b during adjustment, and from general conformance of the glasses 100 to the shape of the head.

In one possible embodiment, the forward stress cavity 142 is shaped and dimensioned to create a reservoir that absorbs at least a portion of the stress created while tightening the forward hinge fastener in the forward adjustment bore 146. This helps minimize cracking and warping of the forward arms 114a-b. In one embodiment, the forward stress cavity 142 is an oblique depression disposed adjacently to the forward hinge 130a-a.

As shown in FIG. 2B, the forward first end 116a-b forms a cantilever 136a-b when the forward arms 114a-b pivot in an inner direction. The cantilever 136a-b is configured to carry stress along the length of the forward arm. Thus, when the forward arms 114a-b are extended, the cantilever 136a-b is disposed flush against the frame 102. The cantilever 136a-b may be slightly curved to conform to the shape of the lateral ends 104a-b on the frame 102. The cantilever 136a-b also forms an aesthetic design to the glasses 100 when jutting out from the forward arms 114a-b.

Figure 8:
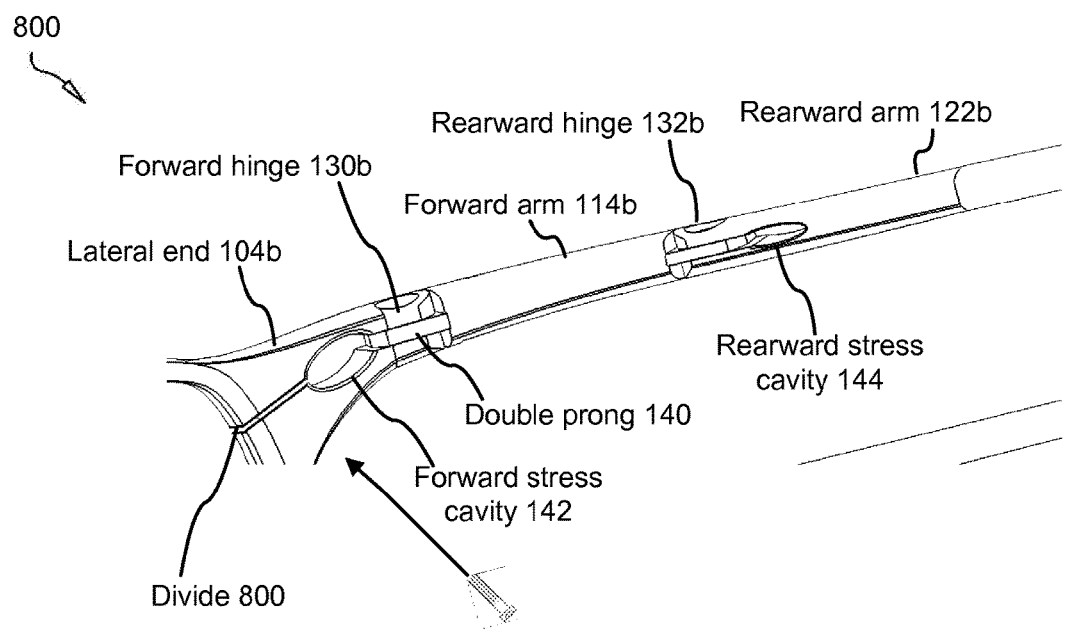
FIG. 8 is an exploded side perspective view of one embodiment of multipurpose eyewear in accordance with the present invention.

Looking now at FIG. 8, the frame 102 bifurcates (or divided) at a divide 800 to enable separation for interchanging and maintenance of the lenses 110a-b. The divide 800 may include an elongated depression that delineates the junction between each hemisphere of the frame 102. Both the lenses 110a-b and the forward arms 114a-b may be detached from the frame 102 while the frame 102 is bifurcated, as described above.

Figure 1B:
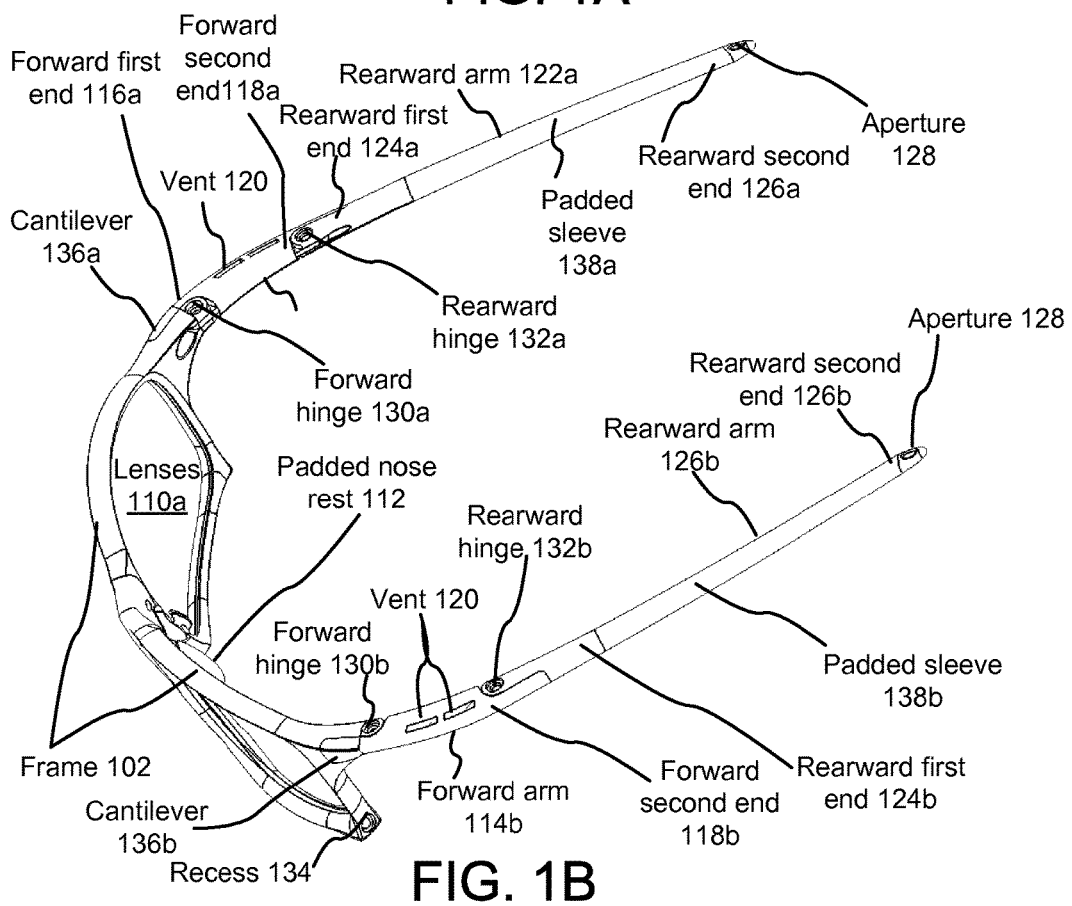
FIG. 1B is a side elevational perspective view of multipurpose eyewear with adjustable arms in accordance with the present invention.
Figure 1C:
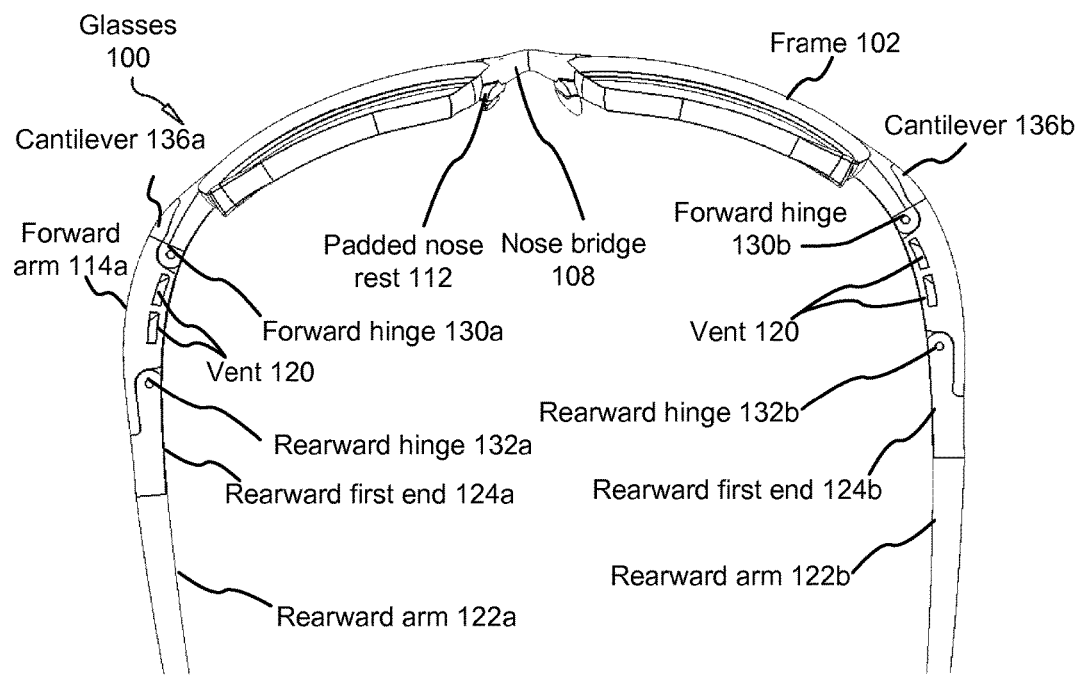
FIG. 1C is a lower elevational perspective view of multipurpose eyewear with adjustable arms in accordance with the present invention.

As shown in FIGS. 1B and 1C, a vent 120 forms in each forward arm 114a-b. The vent 120 is configured to receive airflow that funnels behind the frame 102. In one embodiment, the vent 120 is beveled at the edges, and tapered from the forward first end 116a-b to the forward second end 118a-b, so as to optimize the amount of air flow that can be captured behind the frame 102. The unique position, orientation, and shape of the vent 120 disrupts the air flow, especially directly behind the lenses 110a-b. This disturbance of air flow may generate an Eddie current that minimizes moisture accumulation, i.e., fogging, at the lenses 110a-b.

Figure 1D:
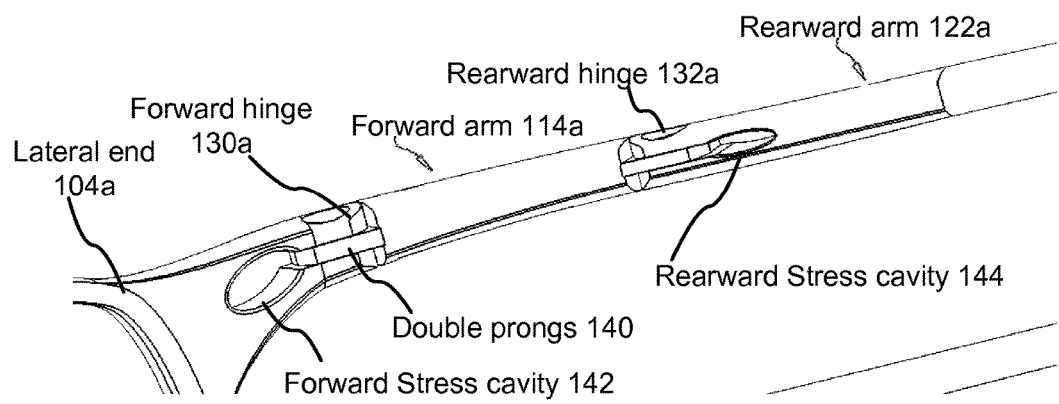
FIG. 1D is an exploded side perspective view of a hinged portion of multipurpose eyewear with adjustable arms in accordance with the present invention.
Figure 1E:
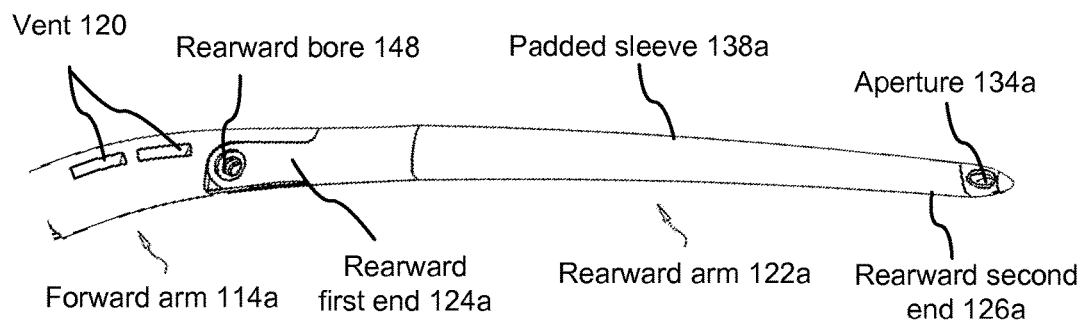
FIG. 1E is an exploded top perspective view of a hinged portion of multipurpose eyewear with adjustable arms in accordance with the present invention.

Looking back at FIG. 1D, a pair of double prongs 140 add additional stability to the general area of the forward hinge 130a-b. The double prongs 140 are disposed at the forward first end 116a-b of the forward arms 114a-b, pivotally moving in conjunction with the forward arm. The double prongs 140 may pivotally project in a rearward direction from the frame 102, or project in a forward direction from the forward arm when the forward arm is pivoted. When the forward arms 114a-b are extended, the double prongs 140 are configured to clamp over the forward stress cavity 142.

Turning back to FIG. 6, the glasses 100 further include a pair of rearward arms 122a-b defined by a rearward first end 124a-b and a rearward second end 126a-b. The rearward arms 122a-b are elongated and flat, so as to fit comfortably behind the ears. The rearward first end 124a-b of the pair of rearward arms 122a-b hingedly join the forward second end 118a-b of the forward arms 114a-b at a rearward hinge 132a-b. The rearward hinge 132a-b forms an axis on which the rearward arms 122a-b pivot. The rearward hinge 132a-b may be adjusted to increase torque for tightening the pivoting motion, or reducing torque for loosening the pivoting action by the rearward arms 122a-b. In this manner, the forward and rearward arms 114a-b, 122a-b fully extend to form a linear arm, or laterally pivot in relation to each other to adjust the width of the glasses 100 around the head.

Figure 9:
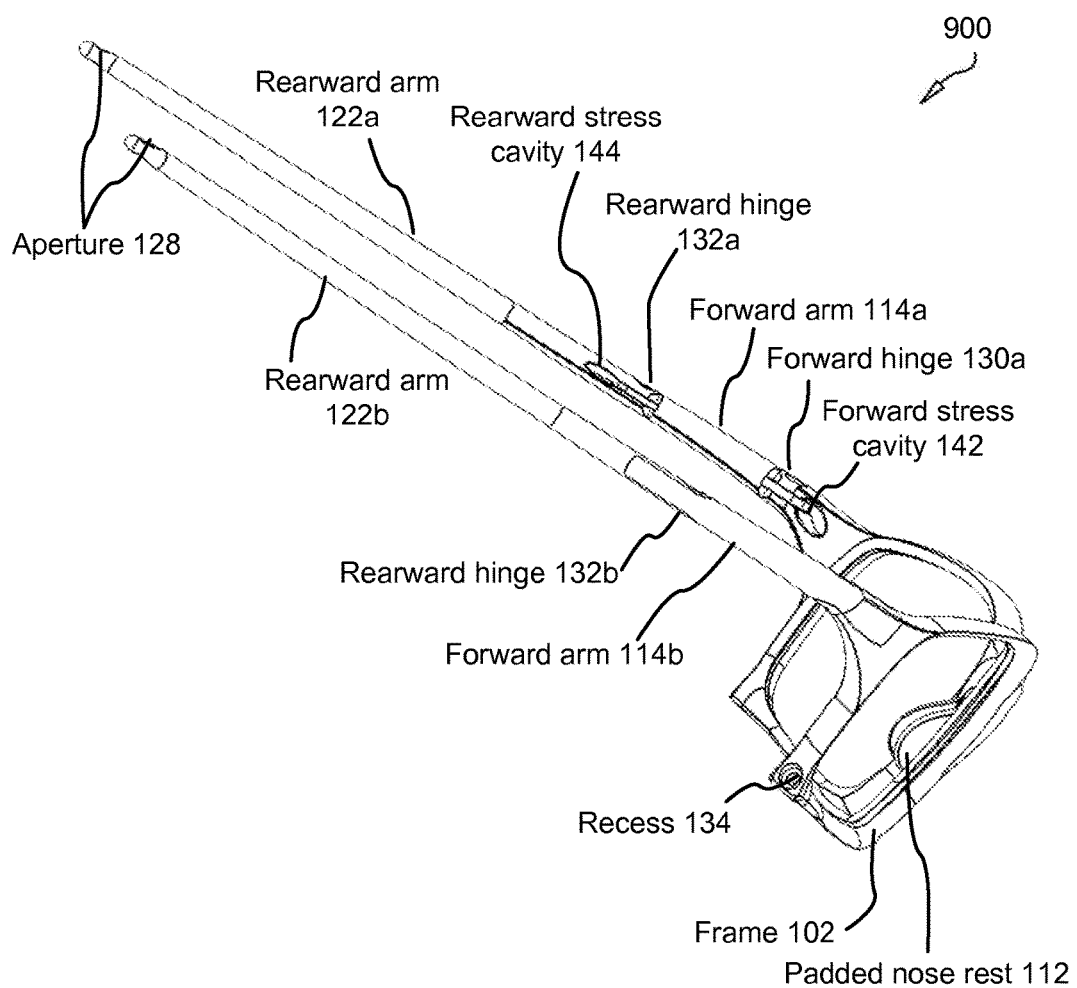
FIG. 9 is a side perspective view of one embodiment of multipurpose eyewear in accordance with the present invention.

As referenced in FIG. 9, a rearward hinge fastener (not shown) is configured to rotatably engage a rearward adjustment bore 148 at the rearward hinge 132a-b for adjusting the pivoting motion of the rearward hinge 132a-b. In one possible embodiment, rotating the rearward hinge fastener in a first direction creates torque on the rearward hinge 132a-b, such that the rearward arms 122a-b do not pivot freely, and eventually are restricted from pivoting. Conversely, rotating the rearward hinge fastener in a second direction enables the rearward arms 122a-b to pivot freely. The rearward hinge fastener may include, without limitation, a screw, a bolt, a pin, a magnet, and an adhesive.

A rearward stress cavity 144 at the rearward hinge 132a-b absorbs stress on the rearward arms 122a-b when the rearward hinge fastener applies pressure and torque on the rearward adjustment bore 148. The rearward stress cavity 144 is shaped and dimensioned to create a reservoir that absorbs at least a portion of the stress created by the rearward hinge fastener. This helps minimize cracking and warping of the rearward arms 122a-b. In one embodiment, the rearward stress cavity 144 is an oblique depression disposed adjacently to the rearward hinge 132a-b.

The rearward second ends 126a-b of the rearward arms 122a-b are tapered. This tapered shape is configured to facilitate reception of a pair of padded sleeves 138a-b. The padded sleeves 138a-b cover the rearward arms 122a-b, and in some embodiments, the padded sleeves 138a-b also cover a portion of the forward arms 114a-b. The padded sleeves 138a-b are configured to provide comfort to the ears and temple when donning the glasses 100. Suitable materials for the padded sleeves 138a-b may include, without limitation, cotton, foam, fleece, polyester, and multiple layers of a nonwoven material.

The rearward second end 126a-b of each rearward arm 122a-b may include at least one aperture 128 that is configured to receive a cable. In one possible embodiment, the cable hangs around the neck or other object for tethering the glasses 100. The cable may include a chain, a string, or any resilient linear member that has sufficient tensile strength to support the weight of the glasses 100.

Figure 10A:
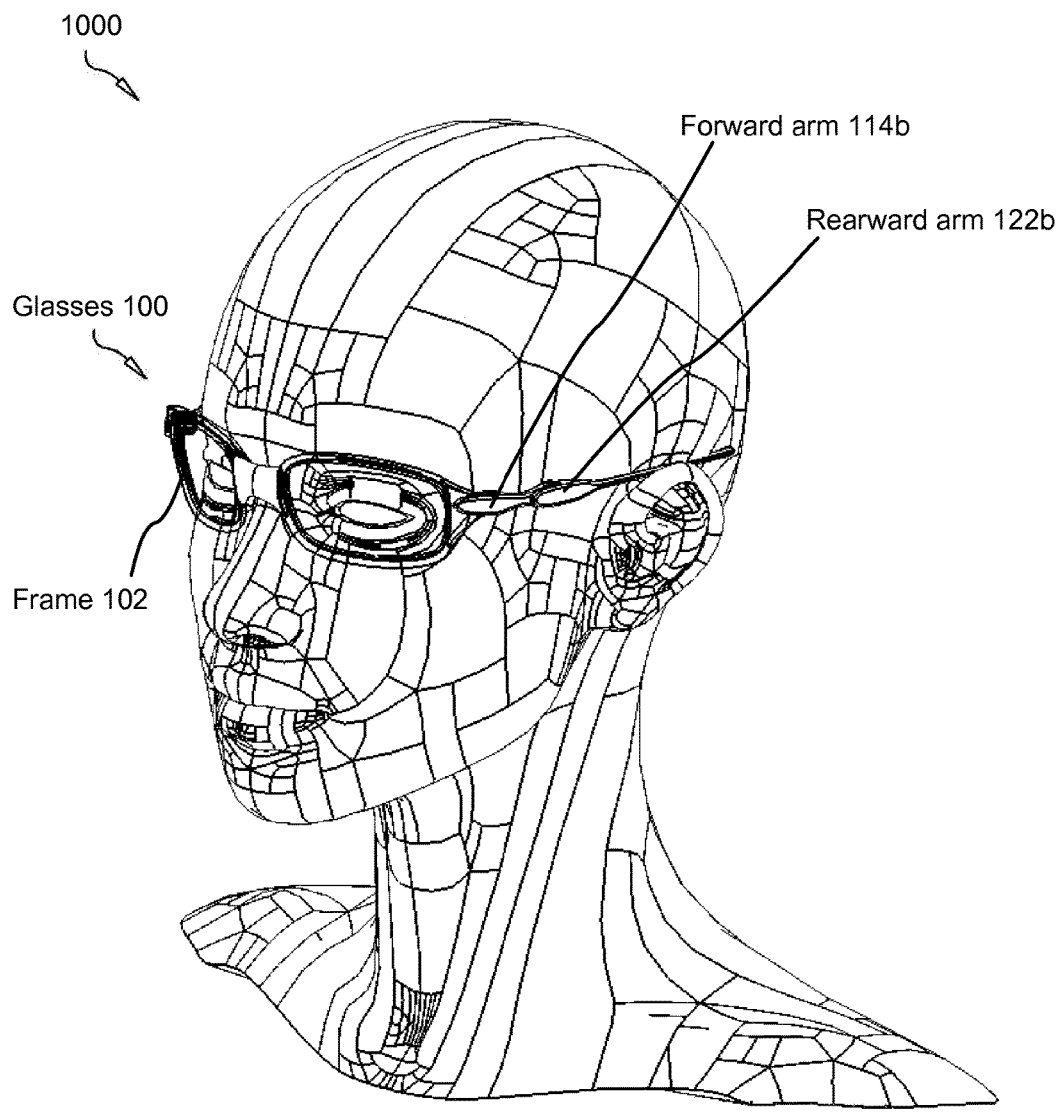
FIG. 10A is a forward side environmental perspective view of one embodiment of multipurpose eyewear in accordance with the present invention.

FIG. 10A illustrates the glasses 100 being donned on the head and the lenses 110a-b directly in front of the eyes. This represents the operational position of the glasses 100. In this embodiment, the forward and rearward arms 122a-b are flexing outwardly to conform to the size and shape of the head. This lateral flexing is possible because both the forward and rearward arms 114a-b, 122a-b pivot laterally in an inward and outward direction about their respective hinges 130a-b, 132a-b, resulting in increased width between the arms 114a-b, 122a-b. This lateral pivoting movement facilitates adjustability of the glasses 100 on the head. Further, the forward and rearward arms 114a-b, 122a-b pivot independently of each other so as to provide greater flexibility for sizing.

Figure 10B:
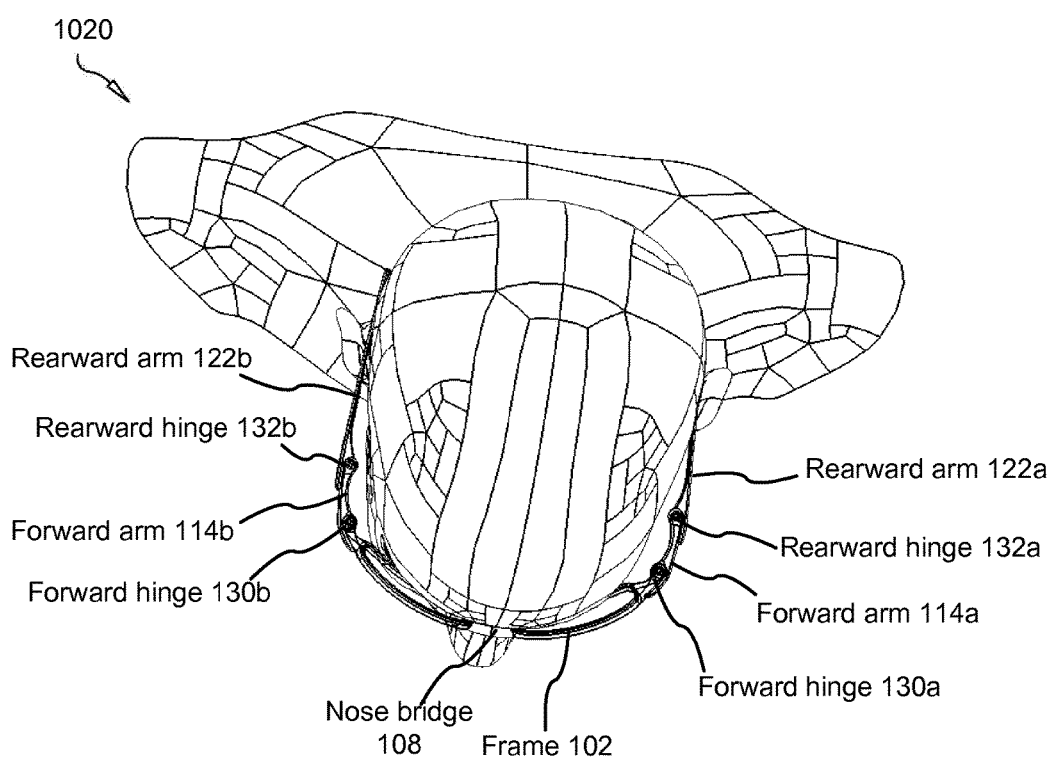
FIG. 10B is a top environmental perspective view of one embodiment of multipurpose eyewear in accordance with the present invention.

FIG. 10B further illustrates the glasses 100 being donned with the nose bridge 108 resting concentrically on the nose and the padded nose rest 112 providing comfort to the nose.

Figure 11:
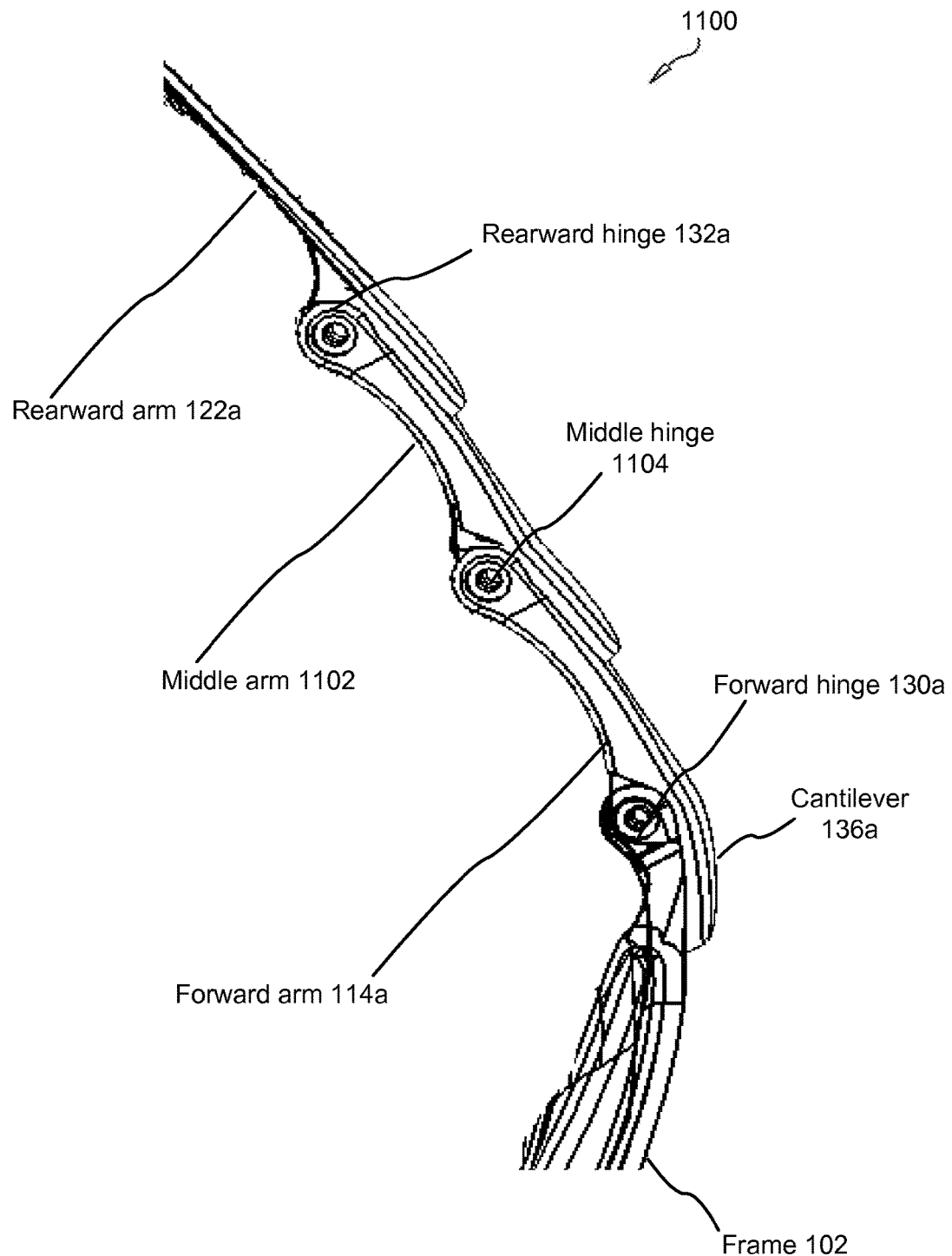
FIG. 11 is a top environmental perspective view of one embodiment of multipurpose eyewear in accordance with the present invention.

In one alternative embodiment, shown in FIG. 11, a pair of multi-arm glasses 1100 are configured substantially the same as the glasses 100, except that a middle hinge 1104 and a middle arm 1102 are adapted between the forward and rearward arms 114a-b, 122a-b. The addition of a hinged middle arm 1102 provides greater flexibility when donning. Further, when pivoted against each other, each arm 114a-b, 122a-b, 1102 the totality creates an ornamental feathering effect. And, as above, each arm 114a-b, 122a-b, 1102 pivots independently of the others. In yet another alternative embodiment, four or more pivoting arms may be used.

As shown, the arms on the sunglasses 100 and/or 1100, or various other embodiments, may comprise a plurality of arm segments, wherein each arm segment comprises a separate component of the arm hingedly connected to either a preceding arm segment or the frame 102. The middle arm 1102, the forward arm 114 and the rearward arm 122, may all consist of or comprise arm segments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. Eyewear, the eyewear comprising:
   one or more lenses;
   one more frames circumscribing the one or more lenses;
   two forward arms, each forward arm hingedly connected to one of the frames; and
   two rearward arms, each rearward arm hingedly connected to one of the forward arms and adapted to pivot laterally with respect to the forward arms.

2. The eyewear of claim 1, wherein each of the forward arms comprises one or more vents traversing the forward arms in substantially longitudinal orientation.

3. The eyewear of claim 1, wherein one of the forward arms and the rearward arms comprise a cantilever for abutting the eyewear, the cantilever preventing axial lateral rotation of one of a forward arm and a rearward arm.

4. The eyewear of claim 1, wherein the forward arm comprises a first cantilever jutting forward partially over one of the frames and a second cantilever jutting rearwardly partially over the rearward arm.

5. The eyewear of claim 1, further comprising four or more cantilevers, each cantilever extending over a hinge.

6. The eyewear of claim 1, wherein one of the forward arms, the rearward arms and the frames comprise an adjustment bore, for receiving a threaded screw, the screw adjustable to change a width between rearward arms.

7. The eyewear of claim 1, wherein each of the frames is affixed to a nose bridge.

8. The eyewear of claim 1, wherein the nose bridge and frames are formed as one integrated piece.

9. The eyewear of claim 1, wherein one or more of the forward arms and the rearward arms define a stress cavity for relieving stress from tensile force exerted on a hinge.

10. The eyewear of claim 9, wherein each frame are bifurcated at a divide between a stress cavity and a lens cavity for expanding each frame to permit interchange of the lens in said frame.

11. Eyewear, the eyewear comprising:
one or more lenses;
one more frames circumscribing the one or more lenses;
a plurality of arm segments forming a sunglass arm, each arm segment hingedly connected to one of: an arm segment preceding in proximity to one of the frames, and one of the frames, each arm segment adapted to pivot laterally with respect to an arm segment preceding in proximity to one of the frames.

12. A pair of glasses, the glasses comprising:
a frame comprising a nose bridge and a pair of lateral ends, the frame configured to concentrically retain a pair of lenses;
a pair of forward arms, the pair of forward arms comprising a forward first end and a forward second end, the forward first end configured to hingedly join the pair of lateral ends at a forward hinge, the forward first end further configured to pivot laterally about the forward hinge, the forward first end further configured to form a cantilever when the pair of forward arms are pivoted, the cantilever configured to carry a stress load;
a pair of rearward arms, the pair of rearward arms defined by a rearward first end and a rearward second end, the rearward first end configured to hingedly join the forward second end at a rearward hinge, the rearward first end further configured to pivot laterally about the rearward hinge; and
wherein the pair of forward arms and the pair of rearward arms pivot independently of each other;
a rearward stress cavity, the rearward stress cavity disposed at the rearward first end, the rearward stress cavity configured to absorb at least a portion of the pressure from the rearward hinge fastener.

13. The glasses of claim 12 defining a recess, the recess disposed at the pair of lateral ends of the frame, the recess configured to receive a frame adjustment fastener, the recess further configured to absorb stress from the frame adjustment fastener.

14. The glasses of claim 13, wherein the frame adjustment fastener is configured to penetrate the recess for securing the frame around the pair of lenses, the frame adjustment fastener further configured to retract from the recess for enabling the frame to bifurcate into two hemispheres.

15. The glasses of claim 12, further including a padded nose rest, the padded nose rest disposed to join with the nose bridge, the padded nose rest configured to rest on a nose.

16. The glasses of claim 12, further including a forward hinge fastener, the forward hinge fastener configured to apply pressure on the forward hinge for tightening and loosening the pivoting motion of the pair of forward arms.

17. The glasses of claim 16, further including a forward bore, the forward bore configured to receive the forward hinge fastener.

18. The glasses of claim 12, further including a forward stress cavity, the forward stress cavity disposed at the forward first end, the forward stress cavity configured to absorb at least a portion of the pressure from the forward hinge fastener.

19. The glasses of claim 18, further including a pair of double prongs, the pair of double prongs disposed at the forward first end of the pair of forward arms, the pair of double prongs configured to clamp over the forward stress cavity.

20. The glasses of claim 12, further including one or more vents, the vents disposed at the forward first end of the pair of forward arms, the vents configured to disrupt air flow behind the pair of lenses.

21. The glasses of claim 12, further including a rearward hinge fastener, the rearward hinge fastener configured to apply pressure on the rearward hinge for tightening and loosening the pivoting motion of the pair of rearward arms.

22. The glasses of claim 21, further including a rearward bore, the rearward bore configured to receive the rearward hinge fastener.

23. The glasses of claim 12, further including a pair of padded sleeves, the pair of padded sleeves configured to at least partially cover the pair of rearward arms.

24. The glasses of claim 12, wherein the rearward second end is generally tapered.

25. A pair of glasses, the glasses comprising:
a frame comprising a brow bar, a nose bridge, a pair of lateral ends, and a recess, the frame configured to concentrically retain a pair of lenses;
a pair of forward arms, the pair of forward arms comprising a forward first end and a forward second end, the forward first end configured to hingedly join the pair of lateral ends at a forward hinge, the forward first end further configured to pivot laterally about the forward hinge, the forward first end further configured to form a cantilever when the pair of forward arms are pivoted, the cantilever configured to carry a stress load;
a forward hinge fastener, the forward hinge fastener configured to apply pressure on the forward hinge for tightening and loosening the pivoting motion of the pair of forward arms;
a forward stress cavity, the forward stress cavity disposed at the forward first end, the forward stress cavity configured to absorb at least a portion of the pressure from the forward hinge fastener;
a pair of rearward arms, the pair of rearward arms defined by a rearward first end and a rearward second end, the rearward first end configured to hingedly join the forward second end at a rearward hinge, the rearward first end further configured to pivot laterally about the rearward hinge;
a rearward hinge fastener, the rearward hinge fastener configured to apply pressure on the rearward hinge for tightening and loosening the pivoting motion of the pair of rearward arms;
a rearward stress cavity, the rearward stress cavity disposed at the rearward first end, the rearward stress cavity configured to absorb at least a portion of the pressure from the rearward hinge fastener; and
wherein the pair of forward arms and the pair of rearward arms pivot independently of each other.

* * * * *